United States Patent
Izumi et al.

(10) Patent No.: US 8,077,696 B2
(45) Date of Patent: Dec. 13, 2011

(54) WIRELESS COMMUNICATION APPARATUS AND WIRELESS COMMUNICATION METHOD

(75) Inventors: Seiichi Izumi, Kanagawa (JP); Hiroaki Takano, Saitama (JP); Hiroaki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 963 days.

(21) Appl. No.: 11/670,141

(22) Filed: Feb. 1, 2007

(65) Prior Publication Data

US 2007/0189263 A1    Aug. 16, 2007

(30) Foreign Application Priority Data

Feb. 14, 2006 (JP) .................. 2006-036018

(51) Int. Cl.
H04J 3/06 (2006.01)
H04B 7/216 (2006.01)
H03K 9/00 (2006.01)

(52) U.S. Cl. ........ 370/350; 375/316; 375/267; 370/208; 370/335; 370/343; 370/465

(58) Field of Classification Search .................. None
See application file for complete search history.

(56) References Cited

U.S. PATENT DOCUMENTS

| | | | |
|---|---|---|---|
| 6,882,633 B2 * | 4/2005 | Dotsch et al. | 370/335 |
| 2004/0196926 A1 * | 10/2004 | Chien et al. | 375/316 |
| 2005/0163244 A1 * | 7/2005 | Seto et al. | 375/267 |
| 2005/0174927 A1 | 8/2005 | Stephens et al. | |
| 2005/0259567 A1 * | 11/2005 | Webster et al. | 370/208 |
| 2005/0281241 A1 * | 12/2005 | Webster et al. | 370/343 |
| 2007/0147414 A1 * | 6/2007 | Niu et al. | 370/465 |

FOREIGN PATENT DOCUMENTS

| | | |
|---|---|---|
| JP | 2002-44051 | 2/2002 |
| JP | 2004-129173 | 4/2004 |
| JP | 2005-17409 | 1/2005 |
| WO | WO 03/034642 A2 | 4/2003 |
| WO | WO 2005/074221 A1 | 8/2008 |

OTHER PUBLICATIONS

"HT PHY Specification", Enhanced Wireless Consortium Publication, V1.28, Jan. 2, 2006, pp. 1-74.

(Continued)

*Primary Examiner* — Jinsong Hu
*Assistant Examiner* — William Nealon
(74) *Attorney, Agent, or Firm* — Oblon, Spivak, McClelland, Maier & Neustadt, L.L.P.

(57) ABSTRACT

A wireless communication apparatus for receiving a packet by detecting synchronization timing. The wireless communication apparatus includes: signal receiving means for receiving a transmission signal from a transmission source through an antenna; synchronization-timing detecting means for detecting synchronization timing using a timing detection field included in a header portion of the packet; synchronization-timing adjusting means for estimating and adjusting the amount of synchronization-timing shift detected by the synchronization-timing detecting means; and receive processing means for performing receive processing of the packet in accordance with the adjusted synchronization timing.

16 Claims, 10 Drawing Sheets

OTHER PUBLICATIONS

Gerhard Bauch, et al. "Othogonal Frequency Division Multiple Access with Cyclic Delay Diversity" ITG Workshop on Smart Antennas, IEEE, Mar. 18, 2004, pp. 17-24.

M. Bossert, et al. "On Cyclic Delay Diversity in OFDM Based Transmission Schemes" Sep. 10, 2002, 5 pages.

Armin Dammann, et al. "Beamforming in Combination with Space-Time Diversity for Broadband OFDM Systems" IEEE International Conference, Apr. 28, 2002, pp. 165-171 and 1 page.

Stefan Kaiser, "Spatial Transmit Diversity Techniques for Broadband OFDM Systems" Global Telecommunications Conference, IEEE, Nov. 27, 2000, pp. 1824-1828 and 1 page.

Aoki Tsuguhide, et al.,"Backward compatibility of CDD preambles", IEEE 802.11-05/0006r1 XP002499704, Jan. 17, 2005, pagres 1-16.

* cited by examiner

| RATE (4 BITS) | | | | R | LENGTH (12 BITS) | | | | | | | | | | | | P | TAIL (6 BITS) | | | | | |
|---|---|---|---|---|---|---|---|---|---|---|---|---|---|---|---|---|---|---|---|---|---|---|---|
| R1 | R2 | R3 | R4 | | | | | | | | | | | | | | | "0" | "0" | "0" | "0" | "0" | "0" |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

WIRELESS COMMUNICATION APPARATUS AND WIRELESS COMMUNICATION METHOD

CROSS REFERENCES TO RELATED APPLICATIONS

The present invention contains subject matter related to Japanese Patent Application JP 2006-036018 filed in the Japanese Patent Office on Feb. 14, 2006, the entire contents of which are incorporated herein by reference.

BACKGROUND OF THE INVENTION

1. Field of the Invention

The present invention relates to a wireless communication apparatus and a wireless communication method in which an OFDM (Orthogonal Frequency-Division Multiplexing) modulation method is applied to a MIMO (Multi-Input Multi-Output) communication.

2. Description of the Related Art

Wireless networks are attracting attention as systems for freeing users from wiring in known wired communication methods. The standards established on a wireless network includes IEEE (The Institute of Electrical and Electronics Engineers) 802.11, etc.

For example, IEEE802.11a/g adopts an OFDM (Orthogonal Frequency-Division Multiplexing) modulation method, which is one of the multi-carrier methods, as a standard of a wireless LAN. In the OFDM modulation method, transmission data is distributed into a plurality of carriers having frequencies orthogonal to each other, and then is transmitted. Accordingly, the band of each carrier becomes a narrow band, and thus the transmission has very high efficiency in the frequency utilization and is resistant to frequency-selective fading hindrances.

The IEEE802.11a/g standards support a modulation method achieving a communication speed of 54 Mbps at the maximum. However, as for a communication speed, a wireless standard enabling a still higher bit rate is demanded. For example, in IEEE802.11n, which is an extended standard of IEEE802.11a/g, next generation wireless LAN technology is designed in order to develop a high-speed wireless LAN standard exceeding an effective throughput of 100 MBPS.

IEEE802.11n adopts an OFDM_MIMO method using OFDM for primary modulation. MIMO (Multi-Input Multi-Output) communication is a technique for achieving high-speed wireless communication by providing with a plurality of antenna elements in both a transmitter and a receiver using a plurality of space-multiplexed spatial streams. The transmitter distributes and sends out transmission data into a plurality of streams using a plurality of antennas, and the receiver performs signal processing using channel characteristics on the space-multiplexed signal received by a plurality of the antennas. Thus, it is possible to divide space, and to extract a signal for each stream without cross talk (for example, refer to Japanese Unexamined Patent Application Publication No. 2002-44051). MIMO communication makes it possible to enlarge the amount of transmission in accordance with the number of antennas, and to achieve an increase in the communication speed without increasing frequency band.

Also, IEEE802.11n is different from IEEE802.11a/g in a transmission method (Modulation and Coding Scheme: MCS) such as a modulation method, a coding method, etc., and achieves high-throughput (HT) transmission. At the same time, it is necessary to allow the coexistence with a communication terminal (in the following, also referred to as a "legacy terminal") which executes an operation mode (in the following, also referred to as a "legacy mode") conforming to the known IEEE802.11a/g. Thus, IEEE802.11n defines "Mixed Mode (MM)" as an operation mode for ensuring the compatibility with IEEE802.11a/g. Specifically, the beginning PHY header of a packet (MIMO signal) includes (1) a preamble (in the following, referred to as a "legacy preamble") having the same format as IEEE802.11a/g, and, subsequently to this, (2) a preamble (in the following, referred to as an "HT preamble") having the format specific to IEEE802.11n. Thus, it is possible for a communication terminal conforming to the IEEE802.11a/g standards to send and receive the packets.

Figure 5:
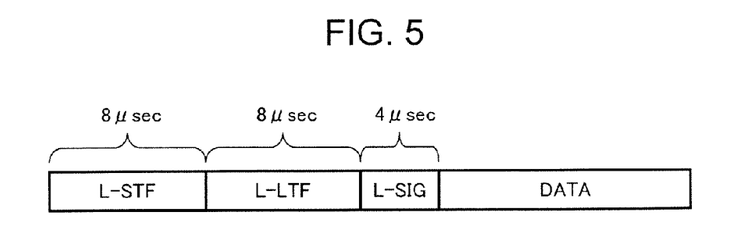
FIG. 5 is a diagram illustrating the format of a packet based on IEEE802.11a/g.

FIG. 5 illustrates the format of a packet (in the following, referred to also as a "legacy packet") based on IEEE802.11a/g. Note that 1 OFDM symbol is assumed to be 4 microseconds (the same in the following). The header portion includes, as a legacy preamble, L-STF (Legacy Short Training Field) including a known OFDM symbol for packet detection, L-LTF (Legacy Long Training Field) including a known OFDM symbol for obtaining synchronization and equalization, and L-SIG (Legacy SIGNAL Field) describing a transmission rate, a data length (note that a value for spoofing a legacy terminal is written in the mixed mode), etc. A payload (data) is transmitted subsequently to this.

Figure 6:
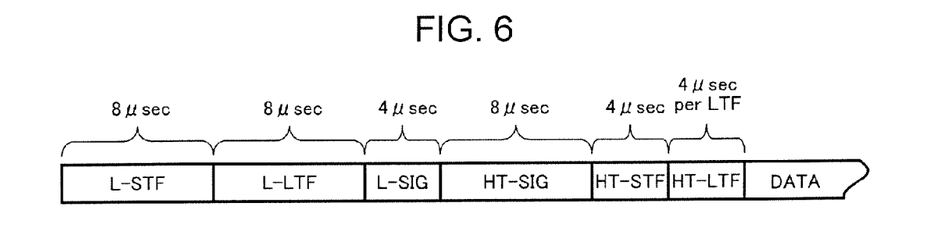
FIG. 6 is a diagram illustrating the format of a packet in the mixed mode being studied in IEEE802.11n.

FIG. 6 illustrates the format of a packet (in the following, referred to also as an "MM packet") in the mixed mode being studied by IEEE802.11n. This header portion includes L-STF, L-LTF, and L-SIG, which are completely the same as the legacy preamble, and subsequently includes an HT preamble in an HT format and a payload (data). The MM packet includes a portion corresponding to the PHY payload in the legacy packet in an HT-format. The HT format includes HT preambles and PHY payloads recursively.

The HT preamble includes HT-SIG, HT-STF, and HT-LTF. HT-SIG includes description of the information necessary to interpret the HT format, such as MCS to be applied to the PHY payload (PSDU), the data length of the payload. Also, HT-STF includes a training symbol for improving AGC (Automatic Gain Control) in a MIMO system. Also, HT-LTF includes a training symbol for performing channel estimation at the receiver.

Figure 7:
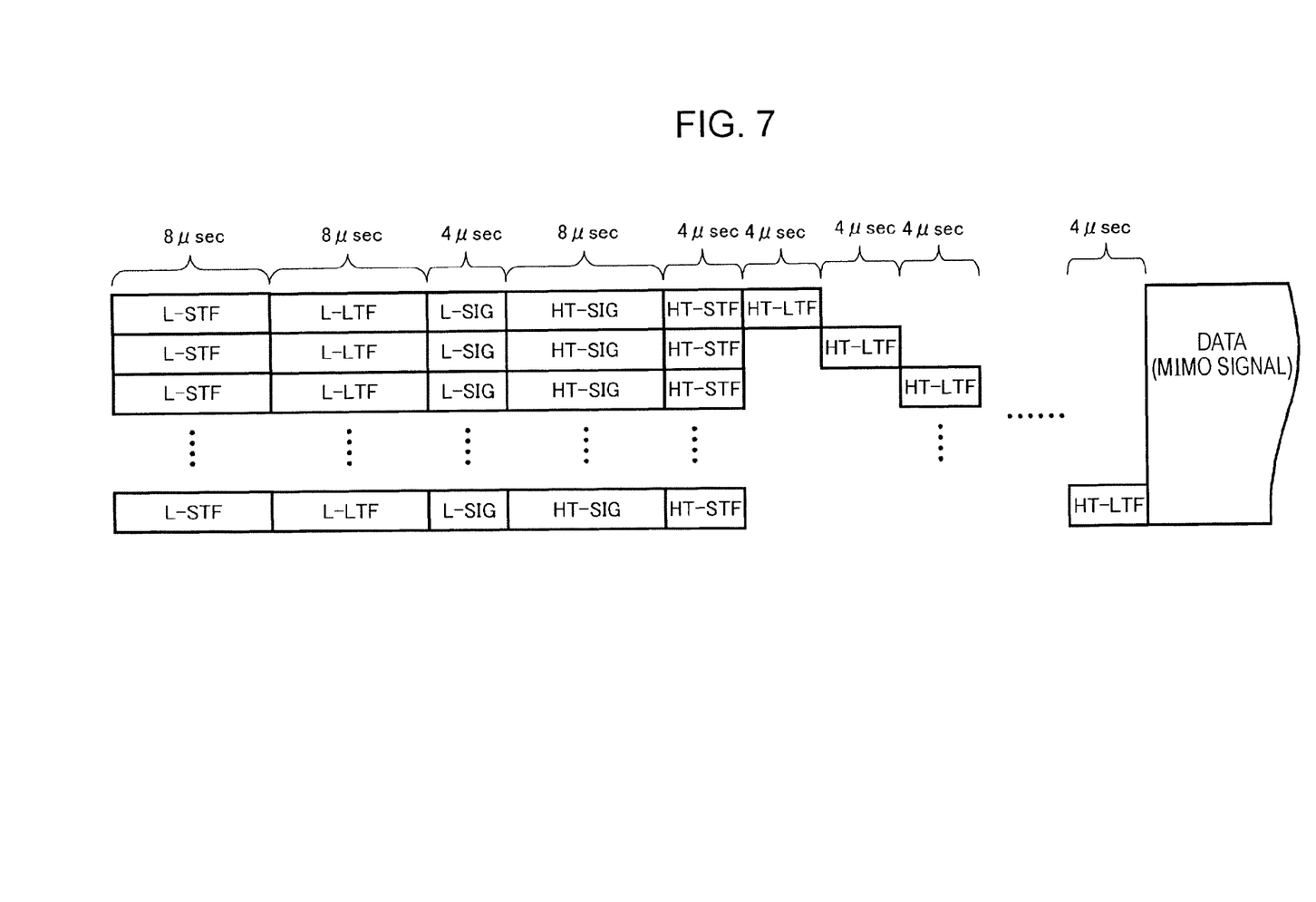
FIG. 7 is a diagram illustrating the packet format when an HT-LTF for each transmission antenna is transmitted in time division at the time of MIMO communication.

In this regard, in the case of the MIMO communication using two transmission branches or more, it is necessary for the receiver to obtain a channel matrix for space dividing the received signal by channel estimating for each transmission and receiving antenna. Thus, the transmitter transmits HT-LTF in time division from each transmission antenna (refer to FIG. 7). The number of the HT-LTF training symbols is not less than the number of spatial streams.

The legacy preamble in the MM packet has the completely same format as the preamble of the legacy packet, and is transmitted by a transmission method allowing a legacy terminal to decode it. In contrast, the HT format portion subsequent to the HT preamble is transmitted by a transmission method not supported by a legacy terminal. A legacy terminal decodes HT-SIG in the legacy preamble of an MM packet to read that the packet is not for that station itself and the data-length information. Thus, the legacy terminal can set NAV (Network Allocation Vector) only during the correct period to avoid collision. As a result, it is possible for the MM packet to achieve the compatibility with legacy terminals.

Also, the MIMO communication has a problem in that when the same or similar signal is transmitted through a different spatial stream, an unintended beam might be formed. Thus, IEEE802.11n is studying a method in which the transmitter transmits a signal from each transmission antenna with a time difference (Cyclic Shift or CDD (Cyclic Delay Diversity)) (for example, refer to EWC (Enhanced Wireless Consortium) PHY Specification). By this means, the cyclic-shift values among transmission antennas are defined for the legacy preamble portion of an MM packet and an HT-format portion, respectively. For example, when performing the MIMO communication having two spatial streams, in the legacy portion, the second spatial stream becomes a time-difference signal having a delay time of −200 nanoseconds with respect to the first spatial stream.

TABLE 1

$T_{CS}^{iTX}$ values for the legacy portion of the packet

| Number of Tx Chains | cyclic shift for Tx chain 1 | cyclic shift for Tx chain 2 | cyclic shift for Tx chain 3 | cyclic shift for Tx chain 4 |
|---|---|---|---|---|
| 1 | 0 ns | — | — | — |
| 2 | 0 ns | −200 ns | — | — |
| 3 | 0 ns | −100 ns | −200 ns | — |
| 4 | 0 ns | −50 ns | −100 ns | −150 ns |

As already described, the legacy preamble of an MM packet has the completely same format as the preamble of a legacy packet. However, if CDD is applied, both packets have a difference in whether the cyclic-shift signal is added. When configuring a communication apparatus supporting both IEEE802.11a/g and IEEE802.11n (in the following, also referred to as an "MM terminal"), it is necessary to receive both of a legacy packet and an MM packet correctly. However, if the signal is subjected to a cyclic shift, a problem arises in the timing of which synchronization is obtained by the legacy preamble (specifically, the L-LTF field).

Figure 8:
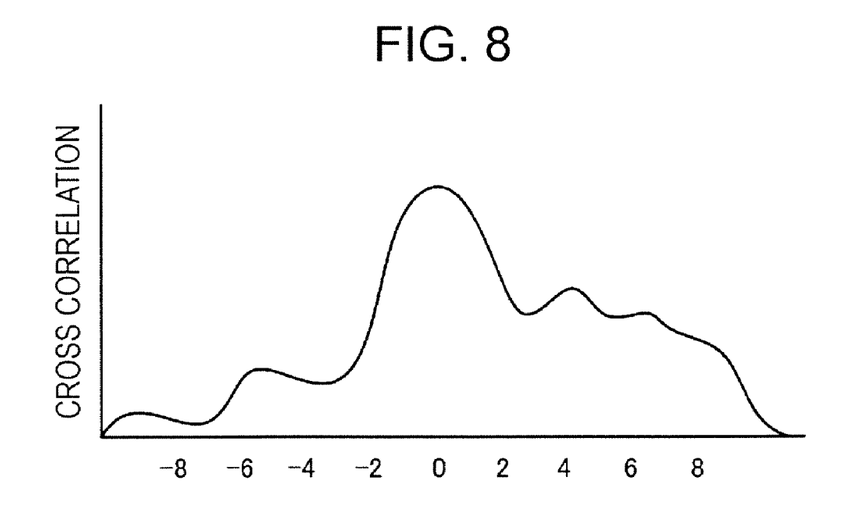
FIG. 8 is a diagram illustrating a state in which correlation appears behind around a reference when cross-correlation is obtained using L-LTF without the addition of a cyclic-shift signal.
Figure 9:
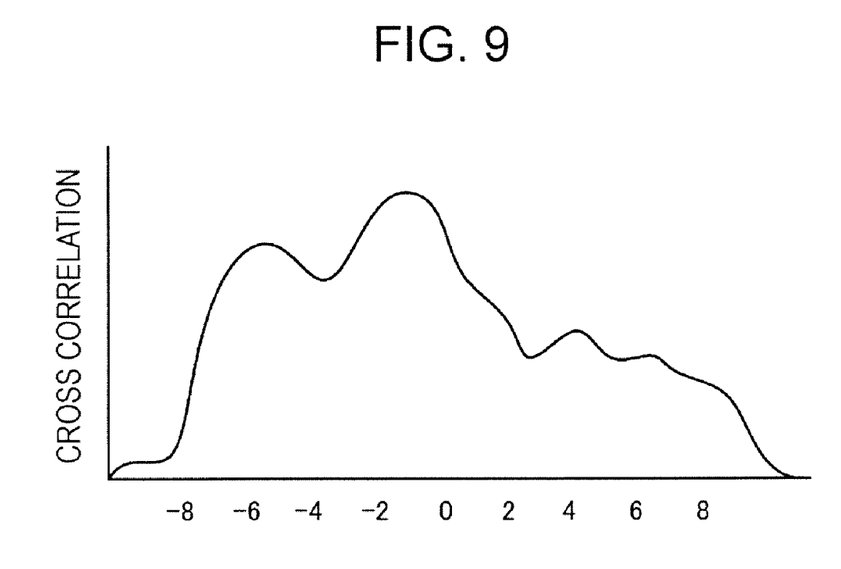
FIG. 9 is a diagram illustrating a state in which correlation increases ahead of the reference when cross-correlation is obtained using the L-LTF with the addition of the cyclic-shift signal.

The receiver normally obtains the cross-correlation between an L-LTF receive signal and a known training symbol on the basis of a peak of the auto-correlation in the L-STF portion in the received legacy preamble, and then obtains synchronization on the basis of the peak position thereof. However, if the cyclic-shift signal is not added, the correlation appears somewhere behind the reference (refer to FIG. 8). In contrast, if the cyclic-shift signal with the transmission timing shifted ahead is added, the correlation primarily appears ahead of the reference (refer to FIG. 9). For example, in a system using two spatial streams, if a delay is small, two peaks appear at the original timing and at the timing by the cyclic-shift signal because of the cross-correlation. However, if a delay becomes large, the peak declines and the delay spread appears widely ahead.

Accordingly, as a result of the addition of the cyclic-shift signal, the synchronization might be obtained a few symbols ahead of the original synchronization timing. Thus, the FFT window for the OFDM modulation is shifted ahead. For example, in the case of 20 MHz, a shift of 200 nanoseconds corresponds to 4 samples.

Even when the FFT window is shifted a little ahead in this manner, in the normal case, interference between symbols caused by the preceding symbol does not occur by a guard interval. However, in the case of a propagation channel having a large delay, interference between symbols occurs because of being out of synchronization, and thus an error might occur.

In particular, when the modulation level of 16 QAM, 64 QAM, or higher is used in the HT-LTF and the HT-DATA portion, if interference between symbols occurs, a floor phenomenon, in which an error rate is not improved in spite of an increase in the SN ratio, occurs. In order to avoid such interference between symbols as much as possible, if the FFT window is shifted behind to the utmost, interference from the succeeding symbol might occur on the other way around.

Also, a channel is subjected to phase rotation with time. Thus, if channel estimation is conducted on the HT-LTF field symbol at an incorrect timing, the timing error influences as a phase error, and thus a high-precision channel matrix is difficult to be obtained. There is a problem in that if the received signal is subject to a MIMO synthesis using a low-precision channel matrix, cross talk occurs between the streams, and thus it is difficult to correctly separate the signal into the original spatial spaces.

If a communication terminal is exclusively used for IEEE802.11n, it is sufficient to receive a packet having only an HT format. Thus, the above-described problem is solved by shifting the obtained timing behind by the amount of the known cyclic shift. However, in the case of an MM terminal, the above-described problem is inevitable, because the synchronization timing is obtained in the legacy preamble in a state in which whether the cyclic-shift signal is added is not yet determined.

SUMMARY OF THE INVENTION

It is desirable to provide an excellent wireless communication apparatus and wireless communication method which can correctly perform the receive processing of a MIMO_OFDM signal having been subjected to a cyclic shift among spatial streams.

It is also desirable to provide an excellent wireless communication apparatus and wireless communication method which conform to IEEE802.11n, have compatibility with IEEE802.11a/g, and can preferably receive both a legacy packet and a mixed-mode packet.

It is further desirable to provide an excellent wireless communication apparatus and wireless communication method which allows to obtain correct synchronization from the legacy preamble portion of an MM packet with a cyclic shift.

The present invention has been made in view of the above-described problem. According to the present invention, there is provided a wireless communication apparatus for receiving a packet by detecting synchronization timing, the wireless communication apparatus including: signal receiving means for receiving a transmission signal from a transmission source through an antenna; synchronization-timing detecting means for detecting synchronization timing using a timing detection field included in a header portion of the packet; synchronization-timing adjusting means for estimating and adjusting the amount of synchronization-timing shift detected by the synchronization-timing detecting means; and receive processing means for performing receive processing of the packet in accordance with the adjusted synchronization timing.

The present invention relates to a wireless communication apparatus for receiving a MIMO signal in a communication system in which an OFDM modulation method is applied to MIMO communication. Specifically, the wireless communication apparatus conforms to IEEE802.11n, and receives legacy packets for IEEE802.11a/g and mixed-mode packets including an HT format for IEEE802.11n.

In MIMO communication, there is a problem in that when the same or similar signal is transmitted through a different spatial stream, an unintended beam might be formed. Thus, IEEE802.11n is studying a cyclic shift in which the transmitter transmits a signal from each transmission antenna with a time difference. However, if a field for obtaining synchronization in a preamble is subjected to a cyclic shift, the synchronization is obtained ahead of the original synchronization timing, and the FFT window is shifted ahead by that amount. As a result, there is a problem in that interference between symbols might occur.

In contrast, a wireless communication apparatus according to the present invention performs normal synchronization processing using a synchronization obtaining field, such as L-LTF, first. After that, if it is detected that the signal is a MIMO signal to which a cyclic-shift signal is added among the streams, the synchronization timing is adjusted on the basis of the amount of the cyclic shift.

Accordingly, even if a timing error caused by a cyclic shift occurs in the original synchronization processing, by the subsequent adjustment of the synchronization timing, it is possible to prevent a floor phenomenon caused by the interference among symbols in the HT-format portion using the modulation level of 16 QAM, 64 QAM, or higher.

It is possible for the synchronization-timing adjusting means, for example to detect whether the received signal by the signal receiving means is a MIMO signal, that is to say, a cyclic-shift signal is added to the received signal on the basis of information on a packet format described in the header portion of the packet. For example, in IEEE802.11n, it is possible to read the number of spatial streams of the MIMO signal on the basis of the MCS value described in the HT-SIG field of the HT preamble. Furthermore, the amount of the cyclic shift can be identified from the number of spatial streams.

Alternatively, the header portion of the packet includes a field having a different modulation pattern depending on whether the cyclic-shift signal is added, and thus it is possible for the synchronization-timing adjusting means to detect whether the cyclic-shift signal is added to the received signal by the signal receiving means by checking the modulation pattern of the field. For example, in IEEE802.11n, the HT-SIG field performs BPSK modulation in a phase space rotated 90 degrees with respect to the L-SIG field. Thus, it is possible to detect the existence of the HT-SIG field by the determination on whether the phase spaces are orthogonal to each other between both of the fields.

Alternatively, it is possible for the synchronization-timing adjusting means to estimate whether the cyclic-shift signal is added to the received signal on the basis of a pattern obtained by an auto-correlation, a cross-correlation, or a channel estimate of the received signal by the signal receiving means. For the delay profile, if the cyclic-shift signal is not added, the correlation appears somewhere behind the reference (refer to FIG. 8), whereas if the cyclic-shift signal is added, the correlation primarily appears ahead of the reference (refer to FIG. 9). In IEEE802.11n, while MIMO communication is carried out using two spatial streams, a cyclic-shift signal having a delay time of −200 nanoseconds is added. Thus, it is possible to estimate that a cyclic-shift signal is added if the delay profile is 200 nanoseconds or more.

The synchronization-timing adjusting means determines the amount of timing correction on the basis of the amount of cyclic shift. The receive processing means may cut out an OFDM symbol using an FFT window having a synchronization position changed in accordance with the amount of the timing correction. Alternatively, the receive processing means may change a position of removing a guard interval in accordance with the amount of the timing correction.

In IEEE802.11n, when the received signal is a MIMO signal, and includes two spatial stream or more, the cyclic-shift signal is added. However, in such a case, it is not always necessary to adjust the synchronization timing. For example, it is necessary to perform the synchronization timing adjustment only at 16 QAM, 64 QAM, or higher modulation levels.

However, it is estimated that in the case of lower modulation levels, satisfactory error rate is obtained without performing the timing adjustment.

In IEEE802.11n, the same modulation level is sometimes applied to each spatial stream constituting a MIMO signal, or a different modulation level for each spatial stream is sometimes applied. The synchronization-timing adjusting means may determine whether to adjust synchronization timing on the basis of a highest modulation level applied to the spatial stream included in the MIMO signal received by the receive processing means.

The synchronization-timing adjusting means determines the amount of timing correction to be less than or equal to the amount of cyclic shift added to the received signal. For example, in comparison with the cyclic-shift signal of 200 nanoseconds, the amount of synchronization timing correction may be set to less than 200 nanoseconds, namely 50, 100, 150 nanoseconds, etc., in consideration of a risk of shifting the FFT window into the next OFDM symbol by an excessive timing adjustment.

Also, the header portion of the packet sent by a MIMO signal includes a field for generating a channel matrix. In such a case, the receive processing means preferably performs receive processing at least on the field for generating the channel matrix and the data portion of the packet in accordance with the synchronization timing adjusted by the synchronization-timing adjusting means. As a result of performing a channel estimation on the channel-matrix generation field at more correct timing, it is possible to perform space separation among streams without cross talk by conducting a MIMO synthesis using a high-precision channel matrix including no phase error.

By the present invention, it is possible to provide an excellent wireless communication apparatus and wireless communication method which can correctly perform the receive processing on a MIMO_OFDM signal which has been subjected to a cyclic shift among spatial streams.

By the present invention, it is possible to perform the receive processing appropriate for receiving both a MIMO signal conforming to IEEE802.11n and a signal conforming to IEEE802.11a/g.

Also, by the present invention, it is possible to obtain more correct synchronization from a MIMO signal which is subjected to a cyclic shift. Thus, it is possible to prevent a floor phenomenon due to the interference among symbols caused by a timing error.

The other features and advantages of the present invention will become apparent by the detailed description on an embodiment of the present invention, described below, and the accompanying drawings.

DESCRIPTION OF THE PREFERRED EMBODIMENTS

The present invention relates to a wireless communication apparatus for receiving a MIMO signal in a communication system in which an OFDM modulation method is applied to MIMO communication. A specific example of the apparatus is a MIMO receiver which conforms to IEEE802.11n. The MIMO receiver is configured to receive both IEEE802.11a/g legacy packets and mixed-mode packets including an HT format for IEEE802.11n.

IEEE802.11n has been studying a cyclic shift in which a transmitter sends a signal with a time difference from each transmission antenna in order not to form unintended beams when the same or similar signal is transmitted through different spatial stream. There is a problem in that if the field for obtaining synchronization is subjected to a cyclic shift, synchronization timing is obtained ahead of the timing of the original synchronization. In contrast, a wireless communication apparatus according to the present invention performs normal synchronization processing using a synchronization obtaining field, such as L-LTF, first. After that, if the signal is detected having been subjected to a cyclic shift among the streams, the synchronization timing is adjusted on the basis of the amount of cyclic shift.

Figure 1:
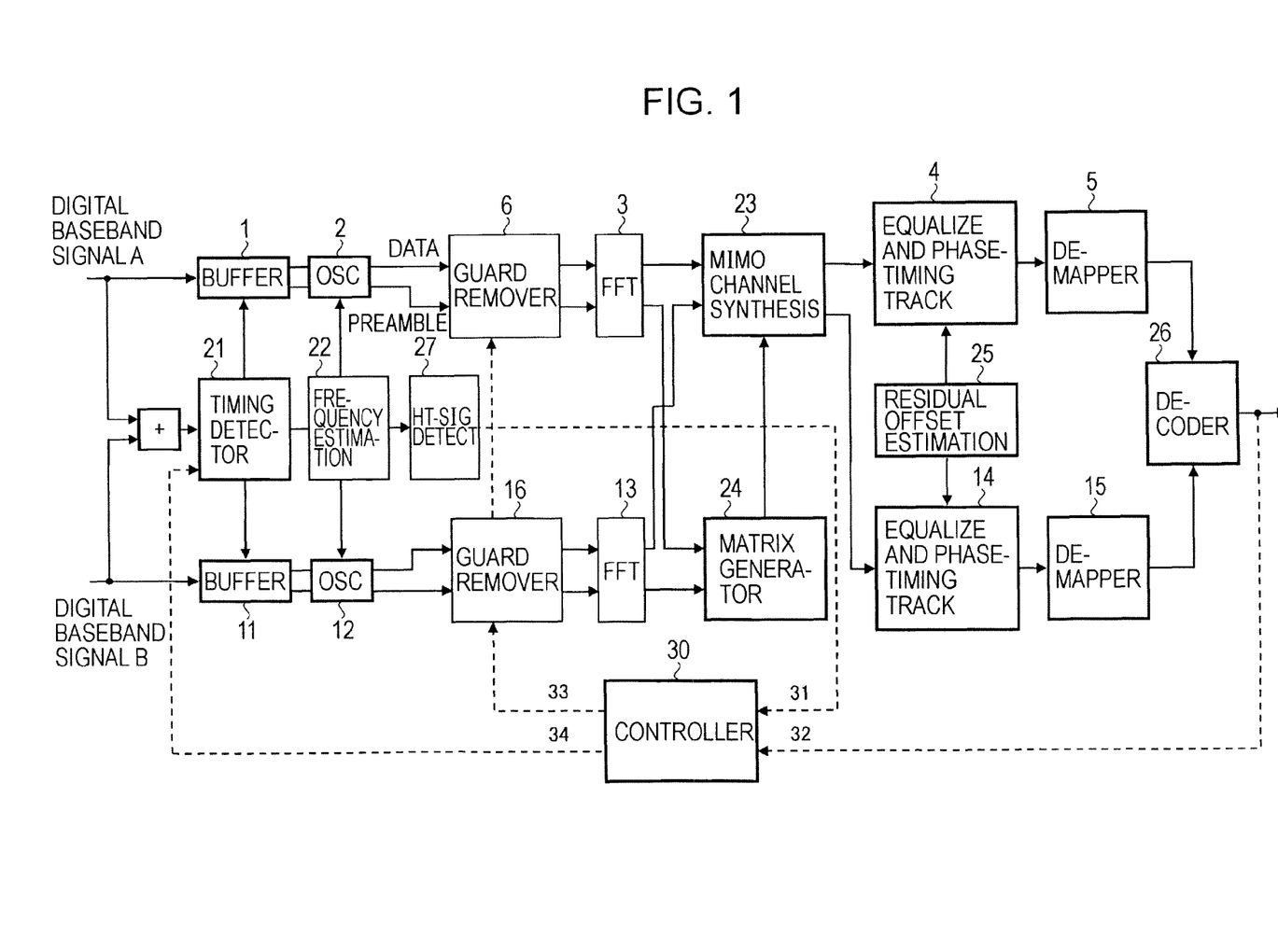
FIG. 1 is a diagram illustrating the configuration of a digital processing section in a MIMO receiver according to an embodiment of the present invention.

FIG. 1 illustrates the configuration of a digital processing section in a MIMO receiver according to an embodiment of the present invention. The receiver shown in the figure is provided with two receiving antennas (not shown in the figure), and receives the MIMO signal including two spatial streams. In the following description, it is assumed that the MM packet shown in FIG. 6 is received.

Two digital baseband signals A and B, which have been obtained by performing RF processing on the signals received by individual receiving antennas, are input from an RF processing section not shown in the figure. The digital processing section, shown in the figure, performs a MIMO synthesis on these digital baseband signals to separate into two independent spatial streams, decodes each of the streams individually, and outputs the original bit strings through de-interleaving, depuncturing, and channel decoding.

HT-SIG out of a legacy preamble and an HT preamble in an MM packet is cut off from each of the digital baseband signals A and B, and then is added with each other by an adder 20 to be input into a timing detector 21.

The timing detector 21 obtains synchronization timing by the auto-correlation of the received signal in L-STF and the cross-correlation between the received signal in L-STF and a known training sequence held by the receiver itself. The digital baseband signal is separated from each of the buffers 1 and 11 for each OFDM symbol in accordance with this synchronization timing.

At the same time with this, frequency-offset correction sections (Osc) 2 and 12 perform frequency correction on the individual digital baseband signals A and B on the basis of the frequency-error estimation value from a frequency-error estimation section (Frequency Estimator) 22. Also, an HT-SIG detection section 27 detects the existence of HT-SIG in the digital baseband signals A and B, and notifies it to the controller 30, details of which will be described later.

After that, each of the digital baseband signals A and B is divided into a preamble and a data portion, is subjected to guard-interval removal by guard removers 6 and 16, and then is sent to fast Fourier transformers (FFTs) 3 and 13, respectively.

The FFTs 3 and 13 decompose the digital baseband signals A and B in time domain into sub-carriers in frequency domain. Also, a channel-matrix generation section (Matrix Generator) 24 generates a channel matrix H for each sub-carrier on the basis of the FFT output of the HT-LTF, which has been transmitted by time division from each transmission antenna (not shown in the figure) of the transmitter.

A MIMO channel synthesizing section (MIMO Channel Synthesis) 23 synthesizes the FFT output of the data portion of the packet for each sub-carrier to separate into each spatial stream using this channel matrix H. Specifically, the MIMO channel synthesis is performed by calculating a reception weight matrix W from the channel matrix H, and multiplying this and the received signal after the FFT. The algorithms for obtaining the reception weight matrix W from the channel matrix H includes, for example Zero Force (zeroizing norm), MMSE (Minimum Mean Square Error), SVD (Singular Value Decomposition)-MIMO, etc, and is not limited in particular here.

Each of the stream signals, which have been subjected to the MIMO synthesis, is sent to equalization and phase-tracking section (Equalize and Phase-Timing Track) 4 and 14 individually. The correction is performed on the remaining frequency offset and the phase tracking, then the signal is demodulated from the modulation point to the original value in the phase space (constellation) by the demodulation sections (demappers) 5 and 15, and is decoded into the original data sequence by the decoding section (decoder) 26.

Figure 2:
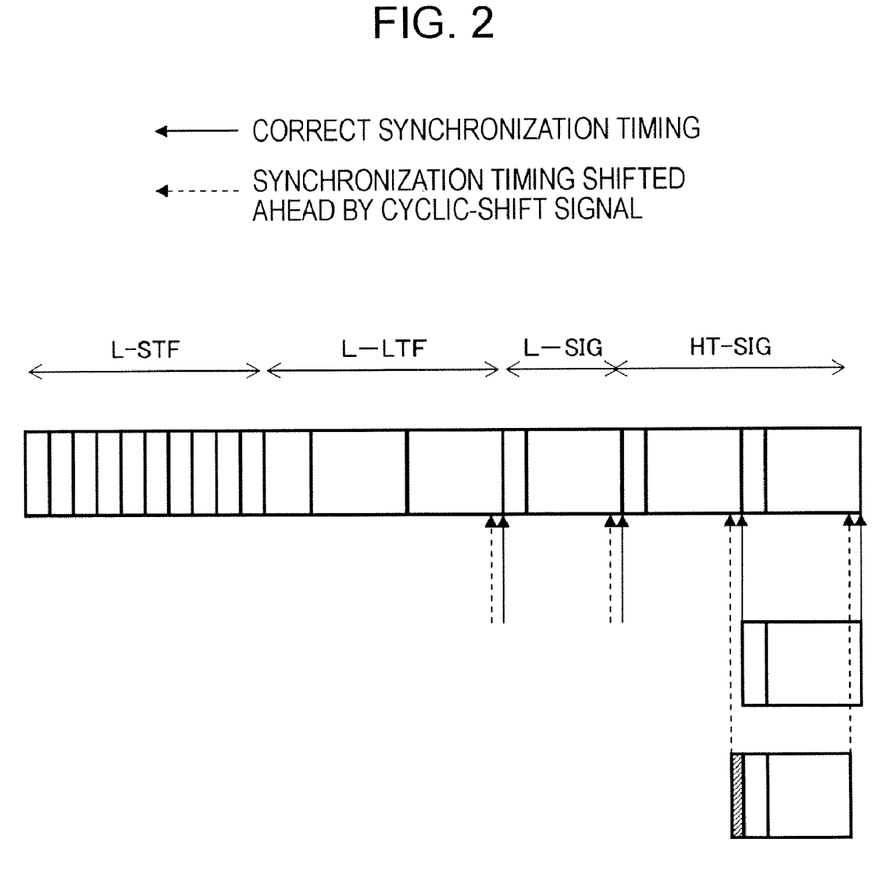
FIG. 2 is a diagram illustrating a state of cutting out an OFDM symbol when synchronization timing is out of sync by a cyclic shift in the MIMO receiver shown in FIG. 1.

FIG. 2 illustrates a state of cutting out an OFDM symbol when the synchronization timing is out of sync by a cyclic shift in the MIMO receiver shown in FIG. 1.

The timing detector 21 obtains synchronization timing by the auto-correlation of the received signal in L-STF and the cross-correlation between the received signal in L-LTF and a known training sequence held by the receiver itself. As described above, the cross-correlation with the received signal, to which an ahead cyclic-shift signal is added, is different from the actual delay profile, and the synchronization timing is set to a time point earlier than the original (refer to FIG. 9).

At this point in time, the receiver does not know whether a cyclic-shift signal is added. Thus, the timing detector 21 performs the channel estimation using L-LTF and the decoding of L-SIG and HT-SIG by setting the synchronization timing to this point in time. When the synchronization timing is set to a time point earlier than the original, as shown by a dashed arrow at the beginning of each symbol of L-SIG and HT-SIG in FIG. 2, each field is read from each of the buffers 1 and 11 at the position where synchronization is shifted a little ahead. L-SIG and HT-SIG are transmitted at a low data rate with BPSK modulation having a coding ratio of 1/2, and thus even if interference between symbols occurs by a little shift in synchronization, there is relatively a little influence.

Figure 10:
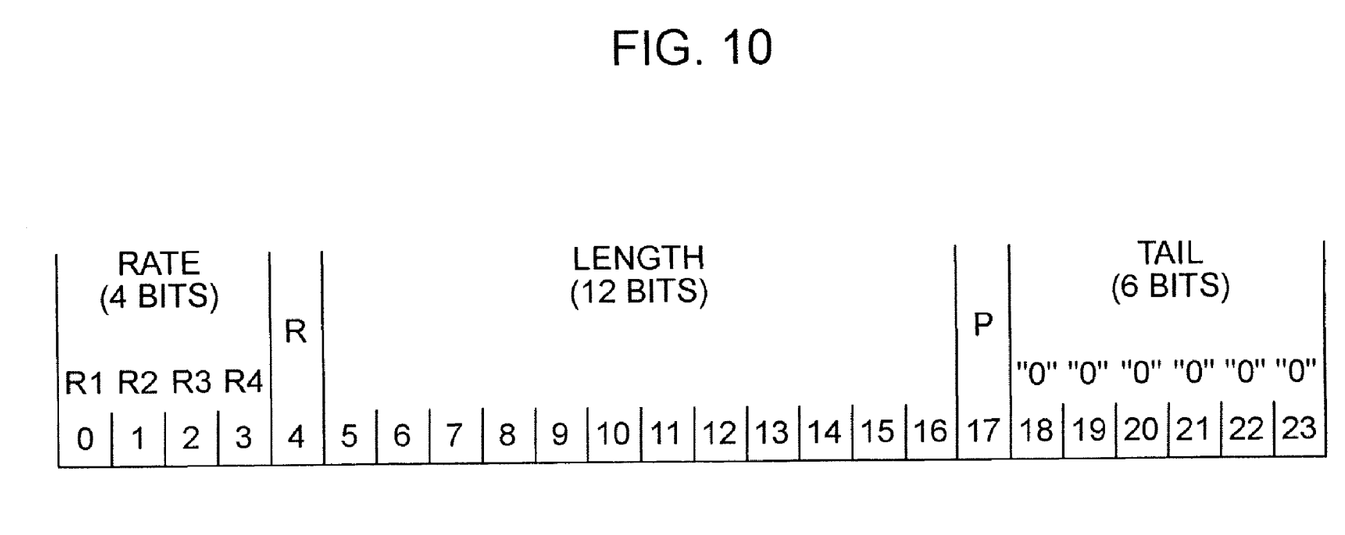
FIG. 10 is a diagram illustrating the data structure of an L-SIG field.
Figure 11:
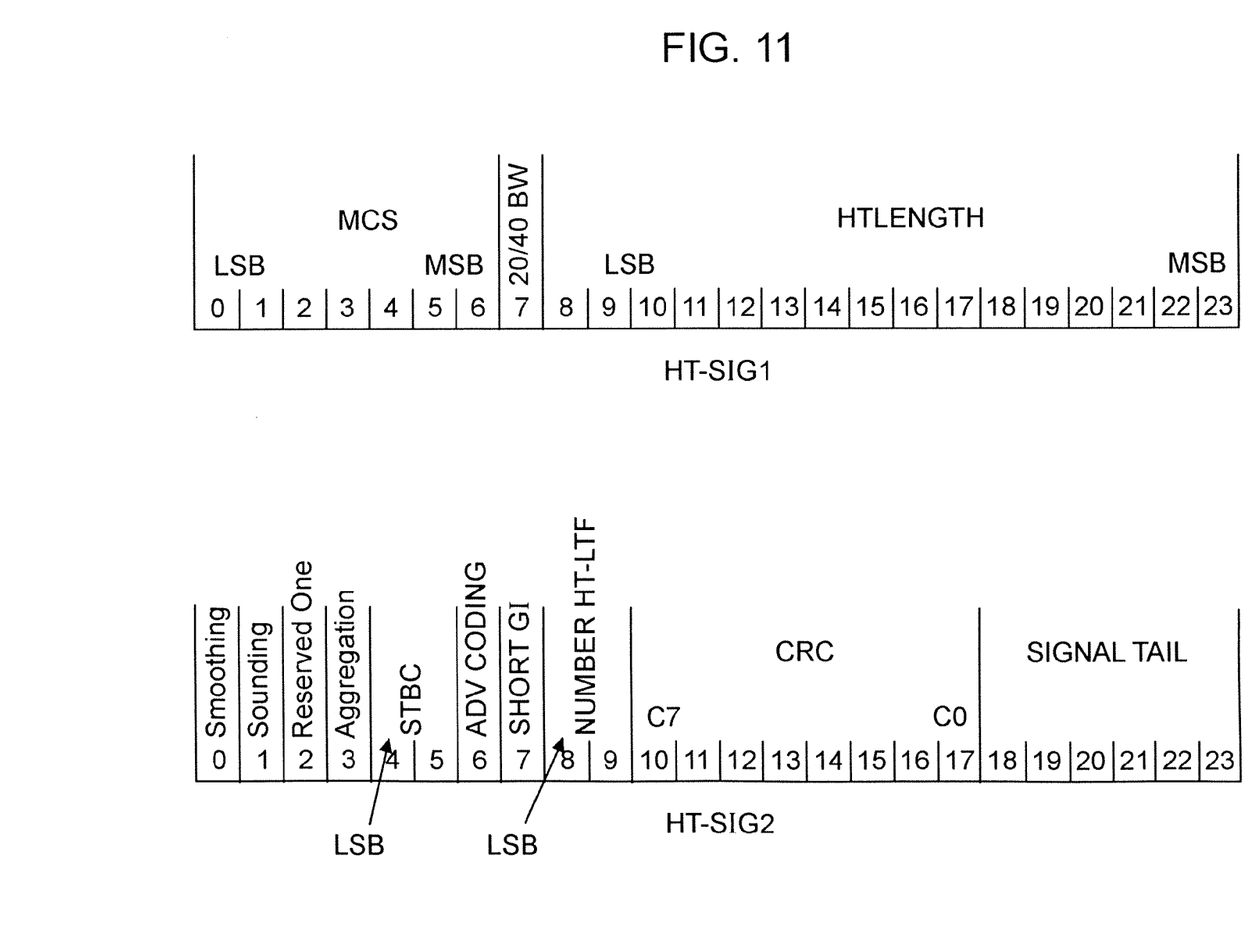
FIG. 11 is a diagram illustrating the data structure of an HT-SIG field.

It is possible to determine whether the cyclic-shift signal is added from the information obtained by decoding L-SIG and HT-SIG. For example, in the MM packet, in a legacy mode, a bit value representing 6 Mbps is mistakenly described in the Rate field of L-SIG (refer to FIG. 10). Also, HT-SIG includes two OFDM symbols (refer to FIG. 11). The information on the transmission method applied to the HT field is obtained on the basis of the MCS (Modulation & Coding Scheme) value included in the HT-SIG1, which is the first symbol. Also, it is possible to identify the number of spatial streams $N_{ss}$ as described below (refer to EWC (Enhanced Wireless Consortium) PHY Specification).

In the case of the same modulation method for each spatial stream:
MCS 0 to 7⇒$N_{ss}$=1
MCS 8 to 15⇒$N_{ss}$=2
MCS 16 to 23⇒$N_{ss}$=3
MCS 24 to 31⇒$N_{ss}$=4

In the case of a different modulation method for each spatial stream:
MCS 33 to 38⇒$N_{ss}$=2
MCS 39 to 52⇒$N_{ss}$=3
MCS 53 to 76⇒$N_{ss}$=4

The cyclic shift value in the HT format portion can be identified from the number of spatial streams $N_{ss}$ in accordance with the following table.

TABLE 2

$T_{CS}^{iSIS}$ values for HT portion of the packet

| Number of spatial streams | Cyclic shift for Spatial stream 1 | Cyclic shift for spatial stream 2 | Cyclic shift for spatial stream 3 | Cyclic shift for spatial stream 4 |
|---|---|---|---|---|
| 1 | 0 ns | — | — | — |
| 2 | 0 ns | −400 ns | — | — |
| 3 | 0 ns | −400 ns | −200 ns | — |
| 4 | 0 ns | −400 ns | −200 ns | −600 ns |

The controller 30 reads the data decoded by the decoder 26, and checks whether the cyclic-shift signal is added to the received signal. When it is determined that the cyclic-shift signal is added (that is to say, the received signal is a MIMO signal including two spatial streams or more), the controller 30 feeds back the control signal 34 for shifting the synchronization timing behind by the amount of cyclic shift from the timing already determined to the timing detector 21. For the symbols subsequent to HT-LTF, the controller 30 shifts the timing behind by the amount of cyclic shift, and performs the demodulation processing after the FFT on the basis of the synchronization timing without this influence.

Figure 3:
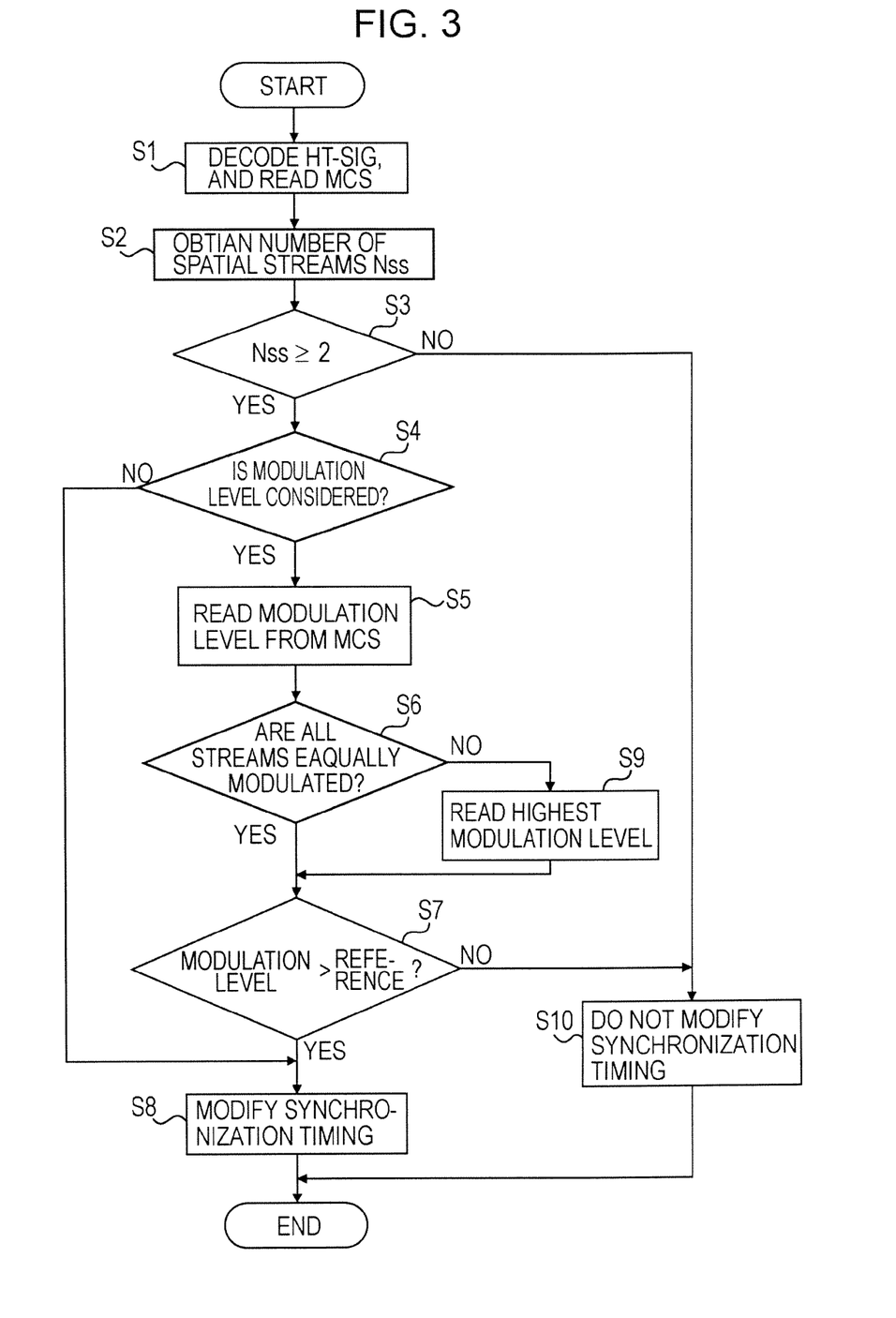
FIG. 3 is a flowchart illustrating the processing procedure for correcting the synchronization timing on the basis of the information provided in an HT-SIG field.

FIG. 3 is a flowchart illustrating the processing procedure for performing the synchronization timing correction on the basis of the information provided in the HT-SIG field.

First, the received HT-SIG is decoded on the basis of the synchronization timing obtained using L-LTF, and MCS is read from the upper four bits of the first symbol (step S1). Then, the number of spatial streams $N_{ss}$ is obtained on the basis of the MCS value (step S2). Each parameter independent from the rate can be retrieved from the MCS value (refer to EWC (Enhanced Wireless Consortium) PHY Specification).

Here, whether the number of spatial streams $N_{ss}$ is 2 or more is checked (step S3).

If the number of spatial streams $N_{ss}$ is 1 (No in step S3), the received signal is not space-multiplexed, that is to say, the cyclic-shift signal is not added to the received signal. Thus, it is not necessary to adjust synchronization timing. Accordingly, with the synchronization timing obtained using L-LTF as it is, the receiving processing is performed on the symbols subsequent to HT-LTF (step S10).

On the other hand, if the number of spatial streams $N_{ss}$ is 2 or more (Yes in step S3), it means that the cyclic-shift signal is added to the received signal. In this case, a determination is further made on whether the synchronization timing obtained using L-LTF should be adjusted on the basis of the amount of the cyclic shift.

For example, the synchronization timing adjustment is performed only by 16 QAM, 64 QAM, or higher modulation levels. However, it is estimated that in the case of lower modulation levels, satisfactory error rate is obtained without performing the timing adjustment.

When the receiver is set to adjust the synchronization timing in consideration of the modulation level (Yes in step S4), the modulation level is read on the basis of the MCS read from the HT-SIG (step S6). Each parameter independent from the rate can be retrieved from the MCS value (refer to EWC (Enhanced Wireless Consortium) PHY Specification).

Here, there are two cases regarding the application of the modulation level. One is to apply the same modulation level to all the spatial streams to be used. The other is to apply a different modulation level to each spatial stream (described above). In the former case (Yes in step S6), whether a uniformly set modulation level is higher than a reference level is checked (step S7). Also, in the latter case, the highest modulation level is read on the basis of the MCS (step S9), and whether this level is higher than a reference level is checked (step S7).

In step S7, when the modulation level is lower than a reference level, there is no need for adjusting the synchronization timing. Thus, the receiving processing of the symbols subsequent to HL-LTF is performed at the synchronization timing obtained using L-LTF without change (step S10).

On the other hand, when the modulation level is higher than a reference level, the synchronization timing obtained using L-LTF is adjusted on the basis of the amount of cyclic shift assigned to the number of spatial streams read in step S3 (step S8).

By such adjustment of the synchronization timing, it is possible to prevent the interference among symbols in the HT-LTF and the HT-DATA portion using the modulation level of 16 QAM, 64 QAM, or higher, and a floor phenomenon caused by this interference. Also, it is possible for the channel-matrix generator 24 to perform channel estimation on HT-LTF at more accurate timing. As a result, it becomes possible for the MIMO channel synthesizing section 23 to perform spatial separation on the basis of a more accurate channel matrix.

Figure 4A:
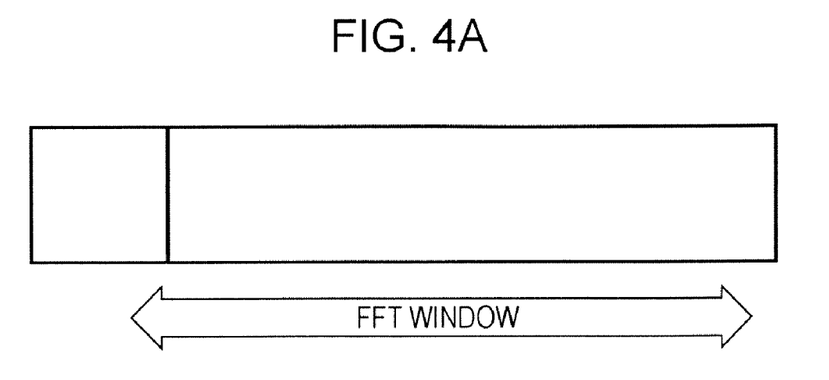
FIG. 4A is a diagram illustrating the FET window position before adjusting synchronization timing on the basis of the amount of cyclic shift at the time of removing a guard interval.
Figure 4B:
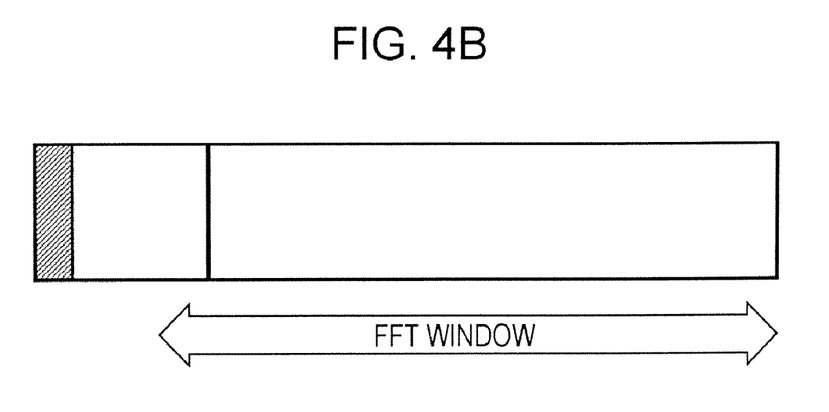
FIG. 4B is a diagram illustrating the FET window position after adjusting synchronization timing on the basis of the amount of cyclic shift at the time of removing a guard interval.

Alternatively, it is possible for the controller 30 to adjust the synchronization timing when feeding back a control signal 33 for adjusting the synchronization timing to the guard removers 6 and 16 in order to remove guard intervals from the OFDM symbols. FIGS. 4A and 4B illustrate states of adjusting synchronization timing on the basis of the amount of cyclic shift at the time of removing a guard interval. FIG. 4A illustrates the FET window position before correcting the timing, and FIG. 4B illustrates the FET window position after correcting the timing.

In the above description, the receiver determines whether there is a cyclic-shift signal from the information described in L-SIG and HT-SIG. However, it is also possible to determine by another method.

For example, it is possible to estimate that the received signal is a MIMO signal, that is to say, that the cyclic-shift signal is added to the received signal from the fact that there is an HT-SIG field. The HT-SIG field has a different modulation pattern from the legacy portion, and thus the HT-SIG detection section 27 can confirm the existence of the HT-SIG field. In this case, the HT-SIG detection section 27 notifies the existence of the field to the controller 30, and the controller 30 feeds back the control signal 34 to the timing detector 21 in response to this.

Figure 12:
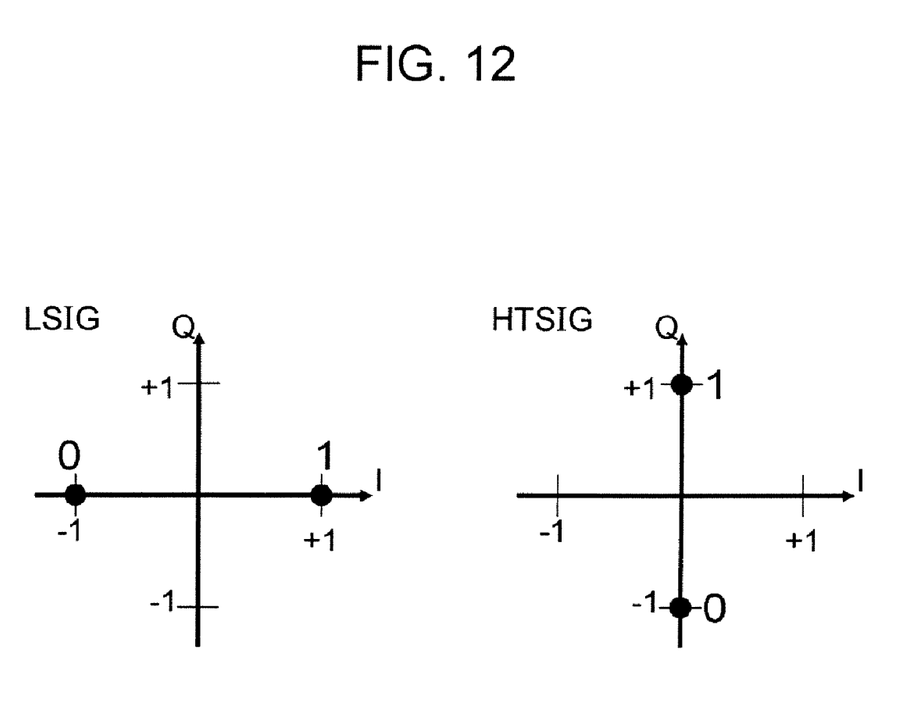
FIG. 12 is a diagram for illustrating the mechanism for performing BPSK modulation of an HT-SIG field in a phase space rotated 90 degrees with respect to an L-SIG field.

The HT-SIG field performs BPSK modulation in a phase space rotated 90 degrees with respect to the L-SIG field (refer to EWC (Enhanced Wireless Consortium) PHY Specification and FIG. 12). Accordingly, it is possible for the HT-SIG detection section 27 to detect the existence of the HT-SIG field by the determination on whether the phase spaces are orthogonal to each other between both of the fields. When the HT-SIG detection section 27 detects the existence of the HT-SIG field, the HT-SIG detection section 27 notifies that to the controller 30.

Alternatively, it is possible to estimate whether the cyclic-shift signal is added on the basis of the pattern of the delay profile obtained by the cross-correlation at the time when the timing detector 21 obtains synchronization using the L-LTF field first. The timing detector 21 should notify this estimation result to the controller 30.

Currently, in the specification under review by IEEE802.11n, for example at the time of MIMO communication using two spatial streams, a cyclic-shift signal having a delay time of −200 nanoseconds is added (refer to EWC (Enhanced Wireless Consortium) PHY Specification and Table 1). Accordingly, if the cyclic-shift signal is not added, the correlation appears somewhere behind the reference (refer to FIG. 8), whereas if the cyclic-shift signal is added, the correlation primarily appears ahead of the reference (refer to FIG. 9).

Thus, if the delay profile is over 200 nanoseconds, it can be assumed that the cyclic-shift signal is added. The controller 30 adjusts the synchronization timing to be 200 nanoseconds behind the timing determined by the timing detector 21.

In this regard, in the above description, in order to eliminate the influence of the cyclic-shift signal, the synchronization timing is shifted behind by the amount of the cyclic-shift signal. However, the amount of timing correction is not limited to the amount of the cyclic-shift signal. For example, in comparison with the cyclic-shift signal of 200 nanoseconds, the amount of synchronization timing correction may be set to less than 200 nanoseconds, namely 50, 100, 150 nanoseconds (1, 2, and 3 samples at 20 MHz, respectively), etc., in consideration of a risk of shifting the FFT window into the next OFDM symbol by an excessive timing adjustment.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus for receiving a packet by detecting a synchronization timing, the wireless communication apparatus comprising:
    signal receiving means for receiving a transmission signal from a transmission source through an antenna;
    synchronization-timing detecting means for detecting a synchronization timing using a timing detection field included in a preamble of the received signal;
    synchronization-timing adjusting means for detecting whether or not the received signal has been subjected to a cyclic-shift and adjusting the synchronization timing detected by the synchronization-timing detecting means based on whether or not the received signal has been subjected to the cyclic-shift; and
    receive processing means for performing receive processing of the received signal based on the adjusted synchronization timing, wherein
    the synchronization-timing adjusting means detects whether or not the received signal has been subjected to the cyclic-shift based on information determined from the preamble of the received signal.

2. The wireless communication apparatus according to claim 1, wherein
    at least a part of the transmission source transmits a time-difference signal having a predetermined time difference in transmission timing, and
    the synchronization-timing adjusting means detects whether or not the received signal includes the time-difference signal, and if the received signal includes the time-difference signal, the synchronization-timing adjusting means corrects the synchronization timing detected by the synchronization-timing detecting means based on the predetermined time difference.

3. The wireless communication apparatus according to claim 2, wherein
    the synchronization-timing adjusting means determines a number of spatial streams based on information provided in the preamble of the received signal.

4. The wireless communication apparatus according to claim 2, wherein
    the preamble of the received signal includes a field having a different modulation pattern depending on whether or not the received signal is a time-difference signal or not, and
    the synchronization-timing adjusting means detects whether or not the received signal includes the time-difference signal by checking the modulation pattern.

5. The wireless communication apparatus according to claim 2, wherein
    the synchronization-timing adjusting means estimates whether or not the received signal includes the time-difference signal based on a pattern obtained by an auto-correlation, a cross-correlation, or a channel estimate of the received signal.

6. The wireless communication apparatus according to claim 1, wherein
    the transmission source is provided with a plurality of transmission antennas to transmit a multiple-input multiple-output (MIMO) signal of a plurality of spatial streams and at least one of the plurality of transmission antennas transmits a signal subjected to a cyclic-shift of a predetermined amount in transmission timing among the plurality of transmission antennas,
    the received signal is a received MIMO signal, and
    the synchronization-timing adjusting means detects whether or not the received signal is subjected to the cyclic-shift and, if the received signal is subjected to the cyclic-shift, the synchronization-timing adjusting means corrects the synchronization timing detected by the synchronization-timing detecting means based on an amount of the cyclic shift.

7. The wireless communication apparatus according to claim 6, wherein
the synchronization-timing adjusting means detects whether or not the received signal has been subjected to the cyclic-shift based on packet format information described in the preamble of the received signal.

8. The wireless communication apparatus according to claim 6, wherein
the preamble includes a field indicating a different modulation pattern depending on whether or not the received signal has been subjected to the cyclic-shift, and
the synchronization-timing adjusting means detects whether the received signal has been subjected to the cyclic-shift by checking the modulation pattern of the field.

9. The wireless communication apparatus according to claim 6, wherein
the synchronization-timing adjusting means detects whether or not the received signal has been subjected to the cyclic-shift based on a pattern of a delay profile obtained by a cross-correlation when the synchronization-timing detecting means obtains synchronization.

10. The wireless communication apparatus according claim 6, wherein
each spatial stream of the MIMO signal is an orthogonal frequency division multiplex (OFDM) modulated spatial stream,
the synchronization-timing adjusting means determines an amount of synchronization timing correction based on the amount of the cyclic shift, and
the receive processing means removes a guard interval of an OFDM symbol using an FFT window having a synchronization position changed based on the amount of synchronization timing correction.

11. The wireless communication apparatus according to claim 6, wherein
each spatial stream of the MIMO signal is an orthogonal frequency division multiplex (OFDM) modulated spatial stream,
the synchronization-timing adjusting means determines an amount of synchronization timing correction based on the amount of the cyclic shift, and
the receive processing means changes a position of a fast Fourier transform (FFT) window based on the amount of synchronization timing correction.

12. The wireless communication apparatus according to claim 6, wherein
a same or different modulation level is applied to each spatial stream of the MIMO signal, and
the synchronization-timing adjusting means determines whether or not to adjust the synchronization timing detected based on a highest modulation level applied to the spatial streams included in the received MIMO signal.

13. The wireless communication apparatus according to claim 6, wherein
the synchronization-timing adjusting means determines an amount of synchronization timing correction to be less than or equal to the amount of the cyclic shift.

14. The wireless communication apparatus according to claim 6, wherein
the preamble of the received MIMO signal includes a field for generating a channel matrix, and
the receive processing means performs receive processing at least on the field for generating the channel matrix and a data portion of the received MIMO signal based on the synchronization timing adjusted by the synchronization-timing adjusting means.

15. A method of wireless communication for receiving a packet by detecting a synchronization timing, the method comprising:
receiving a transmission signal from a transmission source through an antenna;
detecting a synchronization timing using a timing detection field included in a preamble of the received signal;
detecting whether or not the received signal has been subjected to a cyclic-shift and adjusting the synchronization timing detected by the detecting step based on whether or not the received signal has been subjected to the cyclic-shift; and
performing receive processing on the received signal based on the adjusted synchronization timing, wherein
the detecting whether or not the received signal has been subjected to the cyclic-shift is based on information determined from the preamble of the received signal.

16. A wireless communication apparatus for receiving a packet by detecting a synchronization timing, the wireless communication apparatus comprising:
a signal receiving section that receives a transmission signal from a transmission source through an antenna;
a synchronization-timing detecting section that detects a synchronization timing using a timing detection field included in a preamble of the received signal;
a synchronization-timing adjusting section that detects whether or not the received signal has been subjected to a cyclic-shift and that adjusts the synchronization timing detected by the synchronization-timing detecting section based on whether or not the received signal has been subjected to the cyclic-shift; and
a receive processing section that performs receive processing of the received signal based on the adjusted synchronization timing, wherein
the synchronization-timing adjusting section detects whether or not the received signal has been subjected to the cyclic-shift based on information determined from the preamble of the received signal.

* * * * *